Dec. 27, 1955  H. W. MILLS ET AL  2,728,260
LUBRICATING APPARATUS
Filed May 24, 1952  3 Sheets-Sheet 1

INVENTORS
ALBERT A. SCHILLING
HOWARD W. MILLS
BY
ATTORNEYS

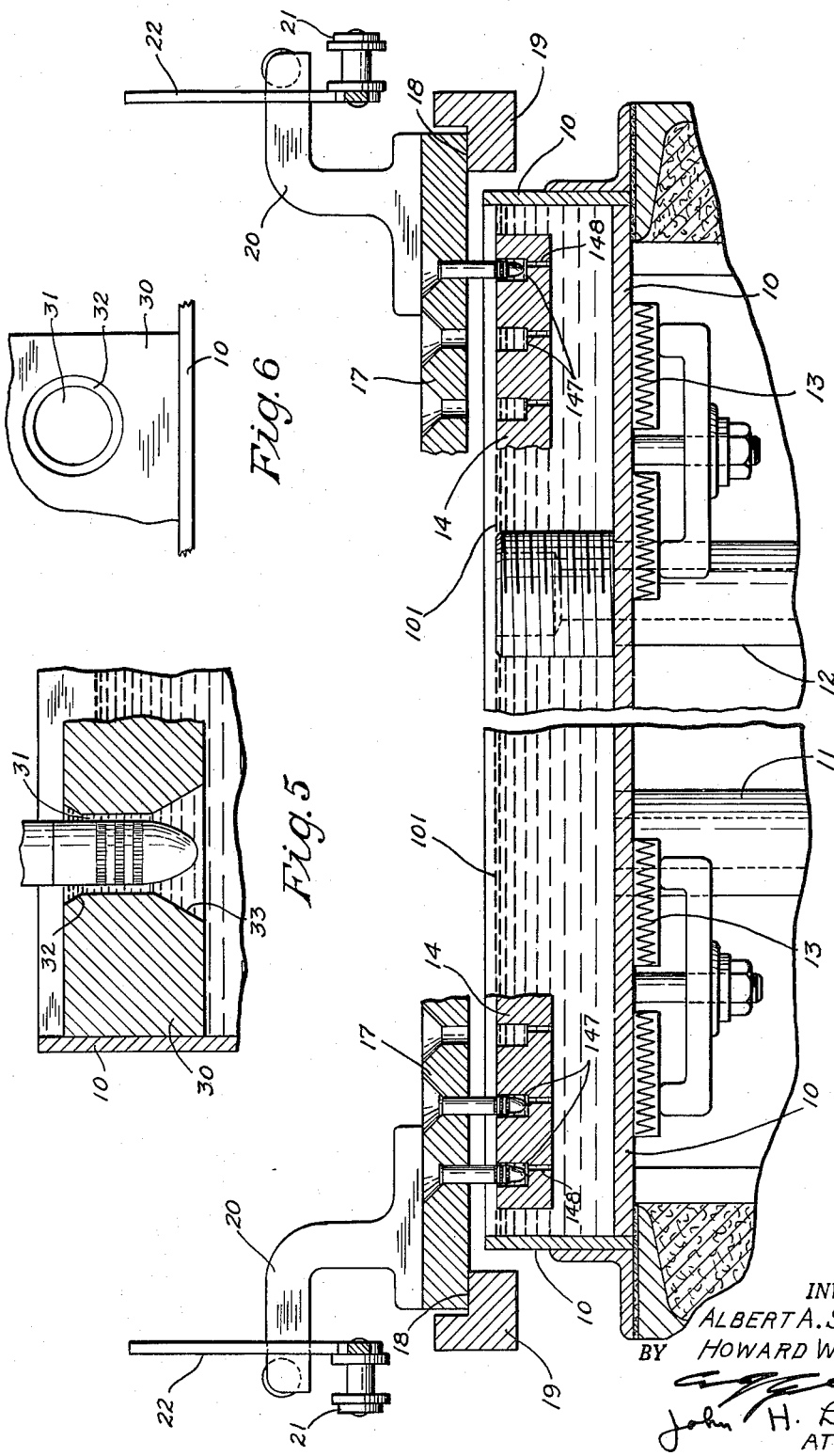

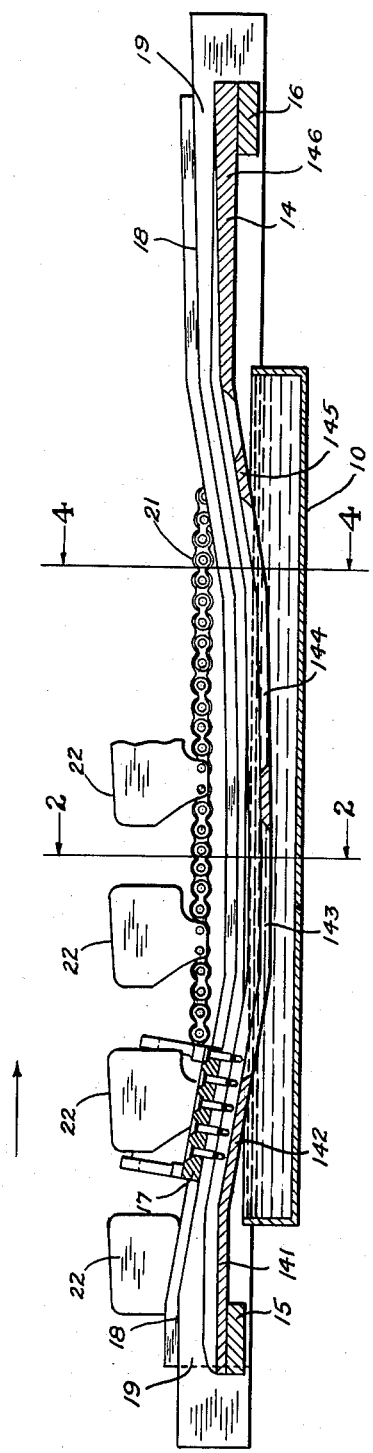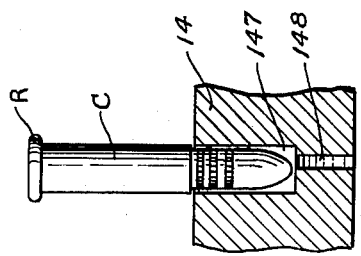

United States Patent Office 2,728,260
Patented Dec. 27, 1955

2,728,260

LUBRICATING APPARATUS

Howard W. Mills, Bridgeport, and Albert A. Schilling, Stratford, Conn., assignors to Remington Arms Company, Inc., Bridgeport, Conn., a corporation of Delaware Application May 24, 1952, Serial No. 289,832

2 Claims. (Cl. 86—19)

This invention relates to lubrication and more particularly to the application of a lubricant to the surfaces of lead projectiles.

Lead surface projectiles require lubrication to avoid friction and abrasion in gun barrels. For most commercial ammunition, it is desirable that the lubricant be one which is solid at ordinary temperatures and preferably presents a hard and dry surface in order to avoid pickup of foreign substances with which it comes in contact. The time-honored method of applying the lubricant is to dip either the bullets or the loaded cartridges containing them in a melt of a grease which is solid at normal temperatures. To avoid the picking up of an excessive amount of grease, the bullets may be preheated, usually by holding them for a time in the molten bath. Upon removal from the molten bath, the cartridges being supported in bullet-down position, a part of the excess of hot grease runs to the tip of the bullet, from which it is removed by touching the bullet tips on a felt pad. This method not only wastes grease on the felt, but almost invariably leaves on the bullet surface a quantity of grease far in excess of that required for adequate lubrication.

The present invention contemplates apparatus for applying to the bullets of loaded cartridges a lubricating film of adequate but not excessive thickness. Excess lubricant is removed from the side and tip of each bullet by approximately disposed surfaces of hot metal so arranged as to drain the excess lubricant thus removed back into the supply tank, leaving on the bullet a thin, hard and substantially dry surface film.

In the drawings:

Fig. 2 is a fragmentary transverse sectional view substantially on the line 2—2 of Fig. 3.

Fig. 3 is a longitudinal section substantially on the line 3—3 of Fig. 1.

Fig. 4 is an enlarged fragmentary detail section substantially on the line 4—4 of Fig. 3.

Fig. 5 is a fragmentary sectional elevation of a modification.

Fig. 6 is a fragmentary plan view of the modification shown in Fig. 5.

Figure 1:
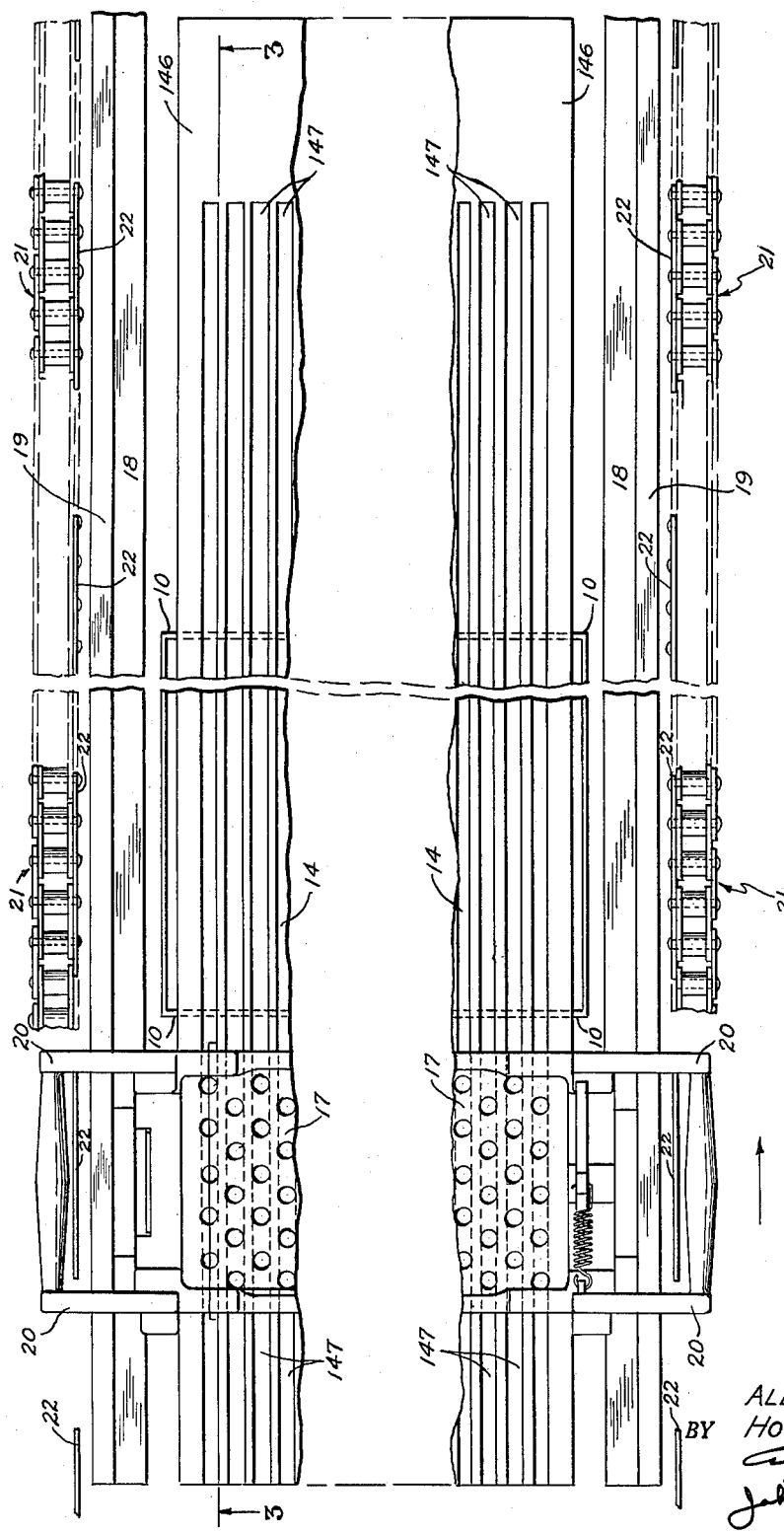
Fig. 1 is a fragmentary partially diagrammatic plan view of one form of apparatus made in accordance with the present invention.

In accordance with the invention, molten lubricant is supplied to a shallow tank 10 through an intake pipe 11. Suitable means such as overflow pipe 12 are provided to enable maintaining a constant level of lubricant in the tank. Means such as heater coils 13 are provided for maintaining the lubricant in the tank at a desired temperature and fluidity. Supported in juxtaposition to the tank 10 in such a manner as to be partially submerged in the body of lubricant 101 in said tank is a tray or channel plate identified generally by numeral 14, which plate is traversed lengthwise by the bullets being lubricated, the movement being from left to right, as seen in Fig. 3. Said plate comprises at its left (Fig. 3) or bullet receiving end, a short horizontal reach 141. Adjacent this horizontal reach, and proceeding to the right in the direction of cartridge movement, the plate comprises a forwardly and downwardly inclined reach 142, a horizontally extending reach 143, a gently upwardly inclined reach 144, a more steeply inclined reach 145 and, finally, a delivery end horizontal reach 146. The end portions 141 and 146 of channel plate 14 are supported by suitable means such as bars or plates 15 and 16.

The level of the lubricant in the tank 10 is preferably so maintained that the horizontal reach 143 of the channel plate is just submerged, the lubricant surface being substantially at the level of the upper surface of said reach 143. Channel plate 14 comprises any desired number of longitudinal parallel grooves or channels 147, which have been illustrated as of substantially rectangular cross-section. These grooves are of uniform depth throughout the length of the reaches 143 and 144 but may decrease in depth in the reaches 142 and 145 respectively, possibly tapering out to zero depth in or adjacent the end reaches 141 and 146. To admit lubricant to and from channels 147, a succession of relatively narrow slots 148 are cut through the lower part of plate 14 from the bottoms of the channels. As best shown in Figs. 2 and 4, each groove is of such width and its deeper portion of such depth as to substantially wholly embrace the bodies of bullets to be lubricated. While such bullets may move freely through the grooves, there is only a small clearance between the lateral portions of the bullets and the sides of the grooves, and between the bullet tips and the bottoms of the grooves. The bullet tips may, under some conditions, contact the bottoms of the grooves or an ungrooved end portion of the plate, but this is immaterial.

The channel plate 14 is preferably made of aluminum or other material of high heat conductivity and radiation. The portion of the plate which is submerged or partially submerged in the bath of hot lubricant has substantially the temperature of said bath. Outwardly from these portions the plate temperature decreases somewhat but is substantially elevated from room temperature. It will be noted that the exit reach end 146 of the plate is further removed from the bath than the entrance reach 141, and the temperature of this reach is preferably somewhat below the melting point of the lubricant. Bullets approaching the bath over reaches 141 and 142 of the plate are in close proximity thereto and are gradually embraced within the channels as above described. Such proximity to the hot and heat radiating aluminum heats the surface portions of the lead bullets but, due to the low heat conductivity of lead, such heating is substantially confined to a region adjacent the surface. As the bullets traverse the submerged reach 143 of the plate, they are further heated, the temperature of their surfaces approaching, if not reaching, the temperature of the molten lubricant. As the bullets traverse the incline 144, they are gradually lifted from the lubricant but are still substantially surrounded by heated media. The proximity of the side walls of the channels draws off any excess lubricant, leaving the bullet surface covered with a thin film. The rate of withdrawal from the lubricant is accelerated as the bullets traverse the reach 145. Fig. 4 illustrates a bullet which has just been elevated out of the lubricant. Both the side portions and the tip are in close proximity to the walls of the groove and excess lubricant has been drawn off onto the grooved walls by its own surface tension. This is particularly true of the lubricant that tends to be held by surface tension in the knurled grooves in the periphery of the bullet and to later run down and congeal in a mass of bullet tip. Due to the narrow gap between the bullet sides and the groove walls, this tendency of lubricant to accumulate in the grooves is quite completely overcome and all parts of the bullet surface receive a lubricant coating of substantially uniform thickness. As the bullets proceed up the incline 145 and over the exit reach 146, the depth of the grooves 147 decreases and the temperature of the plate decreases as above shown, with the result that by the time the bullets reach the end of the channel plate the film of lubricant thereon has completely solidified. Such rapid congealing of the lubricant film is facilitated by the low heat conductivity of the lead of the bullet. Only the surface of the bullet reaches a temperature about the melting point of the lubricant. This characteristic of the lead bullet likewise prevents any substantial rise in the temperature of the brass or copper case which holds the bullet.

By the use of the apparatus and the use of the method above described, an adequate but not excessive quantity of lubricant can be applied to each bullet, the weight of lubricant remaining on a bullet being about half of that left by the use of other methods.

Any suitable mechanical devices may be provided for causing a succession of bullets to traverse the channel plate and the lubricating bath in the manner above described. The devices for this purpose which have been illustrated contemplate the lubricating of the bullets of loaded cartridges C, which cartridges are suspended by their rims R in a cartridge holding plate 17. Each plate 17 is of such length as to span the width of the channel plate 14 and is provided at the ends thereof with cam track engaging surfaces 18 supported on upwardly facing surfaces of cam bars 19, there being one such cam bar suitably supported adjacent each side wall of tank 10. For convenience of manipulation, each cartridge holding plate 17 is provided with upwardly and outwardly extending handle-like parts comprising side bars 20. Suitably disposed in proximity to each cam bar 19 is a conveyor chain 21 having thereon upwardly disposed vanes 22 adapted to be received between the side bars 20 of the cartridge plates. It will be at once apparent that the movement of conveyor chain 21 carries cartridge holding plate 17, in turn, lengthwise of the channel plate 14, and that the configuration of the cam bars 19 carries the bullets of the cartridges in each plate 17 through the cycle of relationships with the channels and the lubricant heretofore described.

Within the purview of the invention are other constructions and arrangements by which bullets to be lubricated are held in close proximity to heat conducting solid bodies while submerged in a bath of molten lubricant, the presence of the heat conducting solid material serving both to heat the bullet surface and to maintain the lubricant in contact with the bullet at or near bath temperature. Thus, for example, the construction illustrated in Figs. 5 and 6 contemplates the replacement of the channel plate 14 with a hole plate 30 suitably held within the tank 10. Plate 30 is provided with a set of holes 31 preferably of circular cross-section in an arrangement and spacing corresponding to that of the cartridge holding apertures in the holding plate 17. The bottom portions of holes 31 are chamfered as shown at 33 to facilitate movement of lubricant in and out of the holes, and the upper portions of the holes are chamfered as shown at 32 to avoid a surge of lubricant onto the shell cases when bullets are inserted in the holes 31 by applying a loaded plate 17 in proper relation to the holes.

As shown in Fig. 5, the level of lubricant in the tank 10 is such as to normally only partly fill the holes 31, and when bullets are inserted in the holes the lubricant level within the holes rises by surface tension, as illustrated. In the use of this form of apparatus, it has been found desirable to preheat the bullets by immersion in molten lubricant in the usual manner. When this is done the time which the bullets remain in the hole plate 30 is about 3 or 4 seconds. Since on withdrawal from the hole plate and the lubricant the bullet tips are not in proximity to a heated metal surface as in the channel plate, it is desirable to touch the bullet tips to a felt pad to remove the excess lubricant which runs to the bullet tip. The weight of lubricant remaining on a .22 caliber long bullet is 4 or 5 milligrams, as compared with about 10 milligrams secured by ordinary production methods.

What is claimed is:

1. Apparatus for lubricating the bullets of assembled cartridges, comprising a tank containing a molten lubricant, a channel plate of heat conductive metal supported in juxtaposition to said tank and comprising a portion submerged in the molten lubricant in said tank, there being in and extending the full length of the submerged portion of said channel plate a channel of a width conforming substantially to the diameter of the bullets to be lubricated and a depth substantially equal to the length of the bullets to be lubricated, means for maintaining a supply of lubricant in said channel, and means for supporting a row of cartridges in alignment with said channel, lowering said cartridges seriatim until the bullets thereof are within said channel and immersed in the lubricant therein and for conveying the cartridges with the bullets so immersed through the length of the submerged portion of said channel.

2. Apparatus according to claim 1, in which said channel plate comprises upwardly inclined end portions traversed by said channel, said apparatus comprising means for moving the cartridges of said row in a direction substantially parallel to the inclination of said channel, whereby each bullet of the row to be lubricated is embraced within said channel as it approaches and recedes from the submerged reach of said channel.

References Cited in the file of this patent

UNITED STATES PATENTS

| 158,960 | Meigs | Jan. 19, 1875 |
| 264,237 | Burns | Sept. 12, 1882 |
| 2,125,827 | Turkington | Aug. 2, 1938 |
| 2,547,548 | Turner | Apr. 3, 1951 |

FOREIGN PATENTS

| 281,698 | Germany | July 22, 1913 |